United States Patent

Berstis et al.

[11] Patent Number: 5,874,936
[45] Date of Patent: Feb. 23, 1999

[54] METHOD AND APPARATUS FOR AUTOMATIC SCROLLING BY REMOTE CONTROL

[75] Inventors: Viktors Berstis, Austin; Manish Manesh Modh, Round Rock, both of Tex.

[73] Assignee: International Business Machines Corporation, Armonk, N.Y.

[21] Appl. No.: 769,841

[22] Filed: Dec. 20, 1996

[51] Int. Cl.⁶ .................................................. H04N 7/173
[52] U.S. Cl. ........................... 345/123; 345/121; 345/341
[58] Field of Search ..................... 345/121, 123, 345/341

[56] References Cited

U.S. PATENT DOCUMENTS

| | | |
|---|---|---|
| 4,578,674 | 3/1986 | Baker et al. . |
| 4,786,895 | 11/1988 | Castaneda ................................. 345/121 |
| 5,038,138 | 8/1991 | Akiyama et al. ........................ 345/123 |
| 5,196,838 | 3/1993 | Meier et al. ............................. 345/121 |
| 5,289,168 | 2/1994 | Freeman .................................. 345/121 |
| 5,493,641 | 2/1996 | Brown . |
| 5,495,566 | 2/1996 | Kwatinetz . |
| 5,530,455 | 6/1996 | Gillick et al. ............................ 345/163 |
| 5,606,344 | 2/1997 | Blaskey et al. .......................... 345/115 |
| 5,677,708 | 10/1997 | Matthews, III et al. ................ 345/115 |

*Primary Examiner*—Mark K. Zimmerman
*Assistant Examiner*—Vincent E. Kovalick
*Attorney, Agent, or Firm*—David A. Mims, Jr.

[57] ABSTRACT

A method and apparatus for automatically scrolling the contents of a window using a remote pointing device. A cursor having vertical and horizontal indicators is displayed in a window where the contents of the window extends beyond the viewable area of the window. The cursor is movable in a selected direction by manipulating the remote control pointing device such that when moved to a boundary of the window, the contents of the window are automatically scrolled in the selected direction. Operation of the remote pointing device after displaying the contents of the window causes the cursor to jump to the next opened window in the viewable area.

4 Claims, 4 Drawing Sheets

METHOD AND APPARATUS FOR AUTOMATIC SCROLLING BY REMOTE CONTROL

FIELD OF THE INVENTION

The present invention relates to data processing systems, and more particularly, to scrolling information displayed in a window using a remote control.

BACKGROUND OF THE INVENTION

Windows are used in computer systems to provide a user with access to the contents or information stored therein. When the computer contains more information then can be displayed at one time, the window displays only a subset of the information. Scrolling the contents of the window is necessary to allow the user to view the remaining information. Thus, scrolling is the process of moving a displayed image vertically (i.e., in the Y-plane) or horizontally (i.e., the X-plane) in a manner such that new data appears at one edge, as existing data disappears at the opposite edge.

Scrolling beyond a screen' boundary refers to the movement of a mouse cursor to an edge of the display area of a window using a pointing device. When the mouse cursor is at the edge of the display area of the window, conventional systems provide a slider control to allow a user to scroll the contents of a window at some speed to display more information to the user. One problem that occurs when scrolling beyond a screen boundary is the need to select a scrolling direction. This may cause the desired information to flash by and disappear from view before the user can stop the scrolling due to the requirement to keep the cursor on the scroll direction indicator. The user must then reverse the direction of the scrolling which often require multiple manipulations of the directional indicators to arrange the information in the view area.

One prior art technique for insuring a known amount of information will be displayed beyond the screen boundary is the use of Page Down (PgDn) and Page Up (PgUp) keys. Manipulating either key causes one page of information to be scrolled in the selected direction. Scrolling one page at a time frequently causes the user to lose a reference point to the information being displayed, since a completely new page of information is presented to the user. One technique for solving this problem is to scroll the information one line at a time. This allows the user to see the reference point as the information is scrolled. However, scrolling the information one line at a time requires significant time when the user wants to progress rapidly through the information.

Recently, an impressive leap in personal-computer design and component-bundling occurred with the introduction of products capable of delivering computing, online access, and television through a users' television set. This technological advance allows a user, via a wireless keyboard or wireless remote control, to scroll virtually unlimited information on a television screen. Users positioned up to 15–20 feet from the television screen can simultaneously watch TV and have online access, with the ability to scroll the online information in a separate window in the comforts of an easy chair. The slider controls used to control scrolling in computers are more difficult to used when operated by remote control. The increased distance from the television screen, makes selection of the slider controls used for scrolling difficult and cumbersome, due to the need for greater and more refined motor skills. This makes it especially difficult for older individuals and children.

Consequently, it would be desirable to provide a technique for easily scrolling information displayed in a window beyond a boundary of the window. It is also desirable to provide a procedure for navigating through multiple open windows in a display area or frames which frequently appear in web pages.

SUMMARY OF THE INVENTION

This invention relates to a method and apparatus for automatically scrolling the contents of a window using a remote pointing device. A cursor having vertical and horizontal indicators is displayed in a window where the contents of the window extends beyond the viewable area of the window. The cursor is movable in a selected direction by manipulating the remote control pointing device. When the cursor is moved to a boundary of the window, the contents of the window are automatically scrolled in the selected direction. Once the contents of the window have been scrolled to show the contents extending beyond the boundary of the window, continued operation of the remote pointing device causes the cursor to jump to the next opened window in the viewable area.

DETAILED DESCRIPTION OF THE EMBODIMENTS

This invention provides a method and apparatus for automatically scrolling the contents of a window when a cursor reaches any boundary of the window. When multiple windows are scrollable, the invention permits the cursor to jump to the next open window if pressed harder or if the scrolling limit has been reached. The invention will be explained in further detail with reference to FIGS. 1–4.

Figure 1:
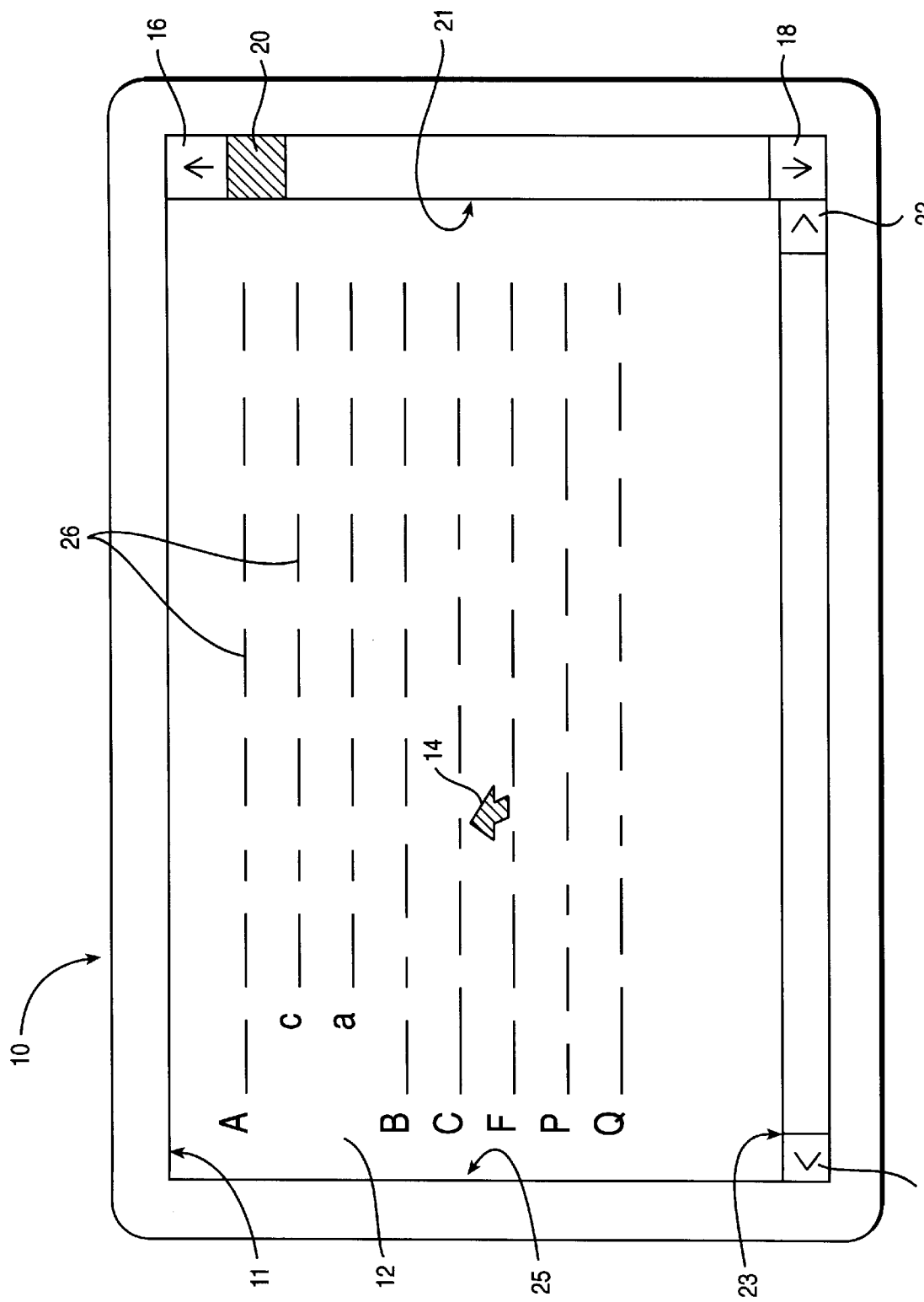
FIG. 1 is a pictorial representation of a computer display screen showing scrolling operations in the prior art.

Referring now to FIG. 1, there is shown a pictorial representation of a computer display screen 10 in the prior art for scrolling the contents 26 of a window 12. The cursor 14 is coupled to a pointing device (not shown) which allows movement of the cursor 14 within the window 12. A slider bar 20 is contained within the window 12 for scrolling the contents 26 vertically beyond the upper boundary 11 or lower boundary 23. This scrolling is accomplished by dragging the slider 20 towards the lower boundary 23 or the upper boundary 11. In addition, the cursor 14 may be placed on the UP arrow 16 or Down (DN) arrow 18, and the pointing device operated to move the contents vertically toward the upper boundary 11 or lower boundary 23, respectively. It will also be appreciated that the contents of the window 12 may be moved horizontally toward the right boundary 21 or left boundary 25. This is accomplished using the left arrow 24 and right arrow 22.

Although the window 12 has been shown as displaying text, more generally, the window may be said to display the "contents". Contents may include representations of files, folders, documents, databases, and spreadsheets, etc. Alternatively, the window 12 may also be said to display information which may include text, video images, graphic data, database records or spreadsheet cells.

Figure 2:
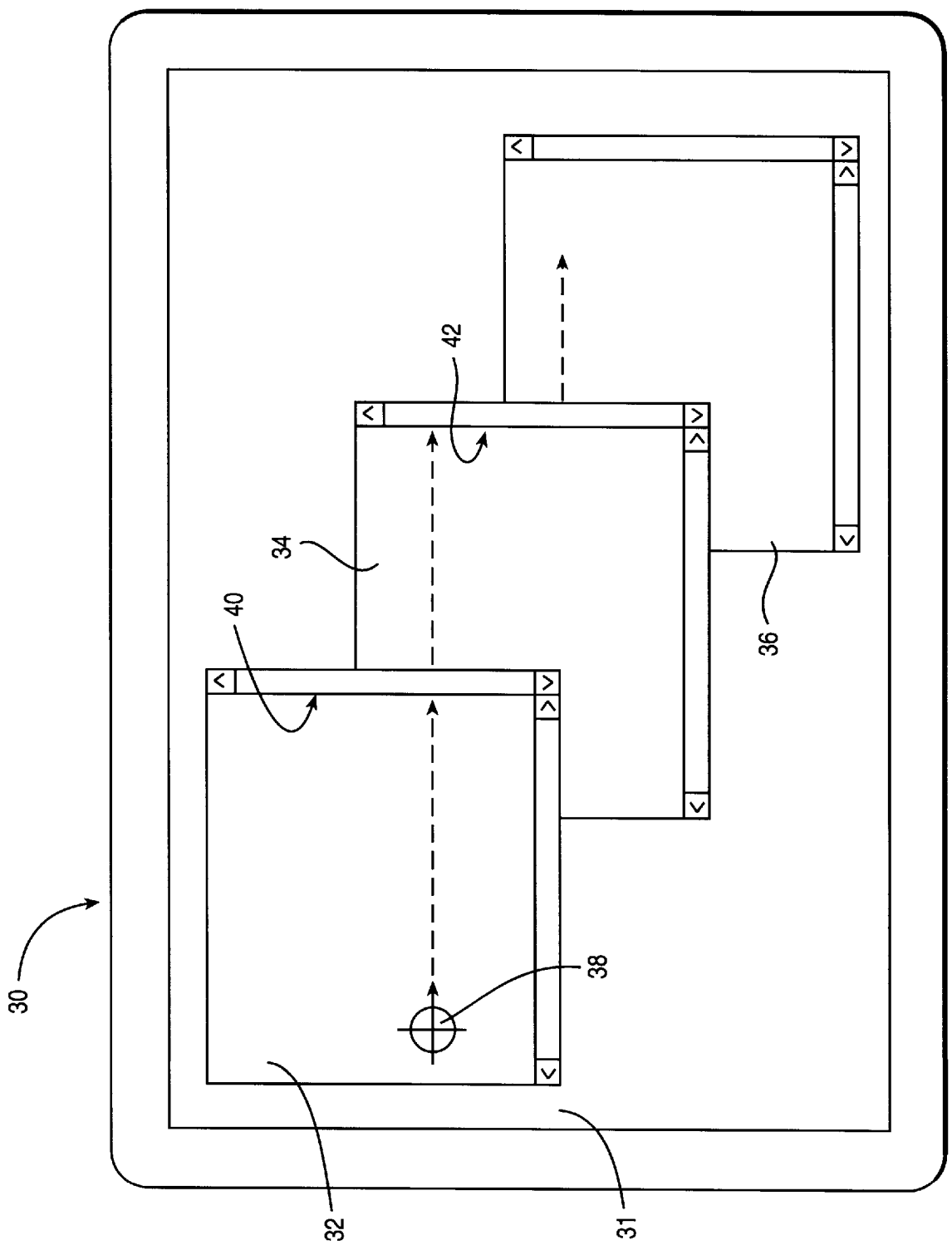
FIG. 2 is a pictorial showing operation of the scrolling mechanism in multiple windows.

Referring now to FIG. 2, there is shown the operation of the automatic scroll function of the invention. A display area 31 contains multiple open windows 32–36. The active window 32, contains the novel cursor of this invention and is shown overlaying windows 34 and 36. When the button on the pointing device controlling cursor 38 is operated, the cursor 38 moves right in the active window 32. When the cursor 38 encounters the right boundary 40 of the active window 32, the contents of the active window 32 are scrolled to the right if a user continues operating the button on the pointing device. Once all contents of the active window have been scrolled to the right, continued operation of the pointing device button causes the cursor 38 to jump from the active window 38 to the closest open window 34. The user can also make the cursor jump to the closest open window before all of the contents of the active window are scrolled by applying a greater force to the pointing device. The middle window 34 now becomes the active window. Further operation of the pointing device will cause the cursor 38 to move right in window 34 until the right boundary 42 is encountered. Again, continued operation of the pointing device button will cause automatic scrolling of the contents of the middle window 34. After all the contents have been scrolled, continued operation of the pointing device button causes the cursor 38 to jump to the closest window 36. The above description applies to movement of the cursor horizontally as indicated by the arrow on cursor 38. In a similar manner, the invention allows movement of the cursor 38 vertically in the window to permit scrolling of the contents vertically. The cursor 38 will indicate the selected vertical scrolling direction and will maintain the ability to jump to the next closest opened window once all the contents of an active window have been displayed or the user applies a greater force on the pointing device before the all of the contents of the window have been scrolled.

Figure 3:
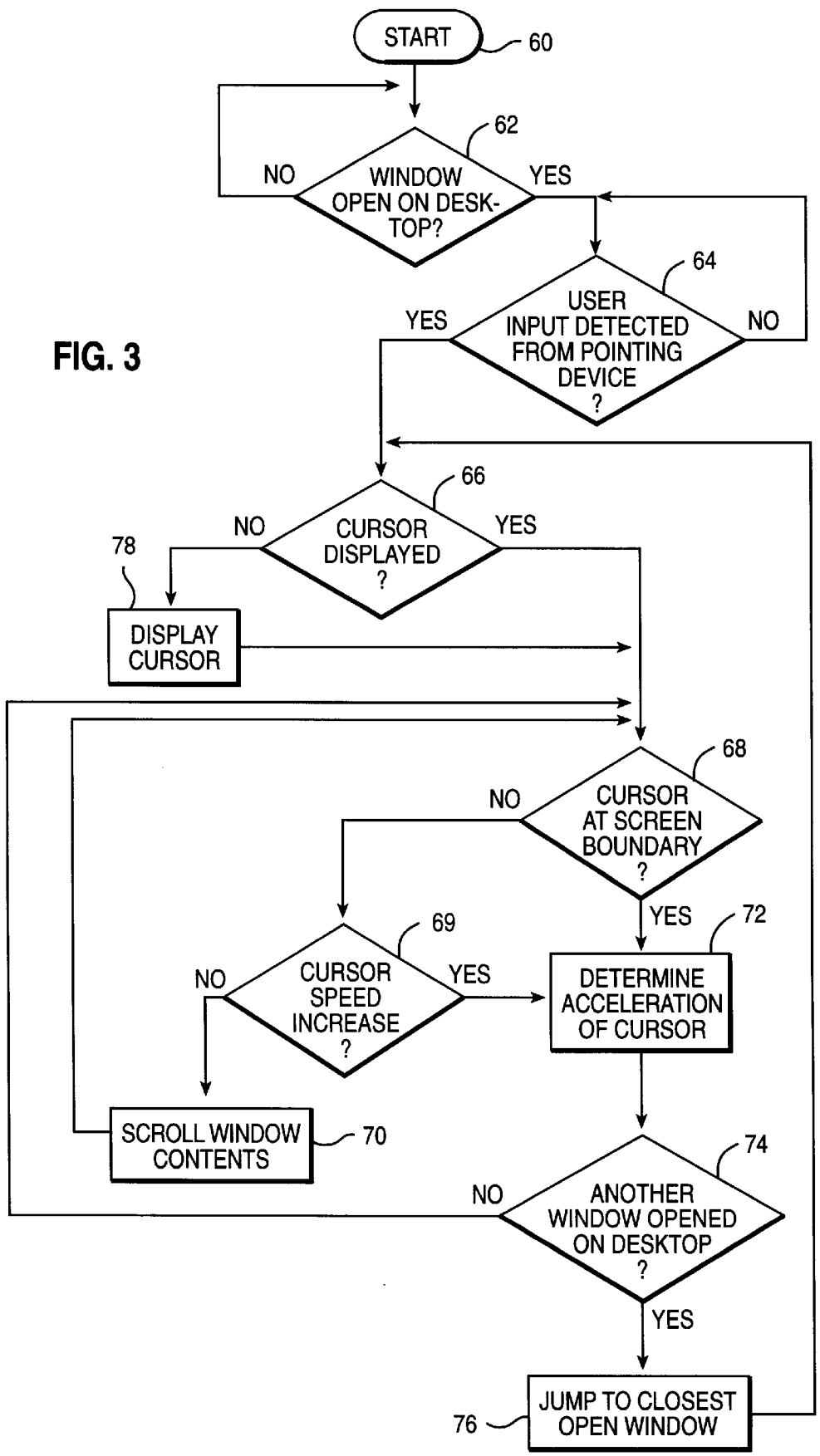
FIG. 3 is a flow diagram of the scrolling mechanism of this invention.

Referring now to FIG. 3, there is shown a flow diagram for controlling the operation of the cursor using the invention. The procedure starts at block 60 and proceeds immediately to block 62 where a check is made to determine if a window is opened. If NO, the procedure continues to loop awaiting opening of a window. If YES, the procedure moves to block 64 where a determination is made whether user input have been detected from the pointing device. If NO, the procedure loops awaiting user input. If YES, at block 66 a check is made whether a cursor is displayed in an opened window in the viewing area. If NO, the procedure causes a cursor to be displayed and moves to block 68 to check if the cursor is at the screen boundary. If NO, the procedure determines at block 69 if the cursor speed has increased indicating that the user has pressed harder on the pointing device. If YES, the procedure proceeds to block 72 to determine the acceleration of the cursor. If NO, the procedure causes the contents of the window to be scrolled as shown in block 70, and returns to block 68. If YES, processing proceeds to block 72 where the procedure determine the acceleration of the cursor resulting from continued operation of the pointing device button. At block 74, the procedure checks to determine if another window is opened on the viewing area. If YES, the procedure causes the cursor to jump to the closest open window and processing continues at block 66. If NO, processing continues at block 68.

Figure 4:
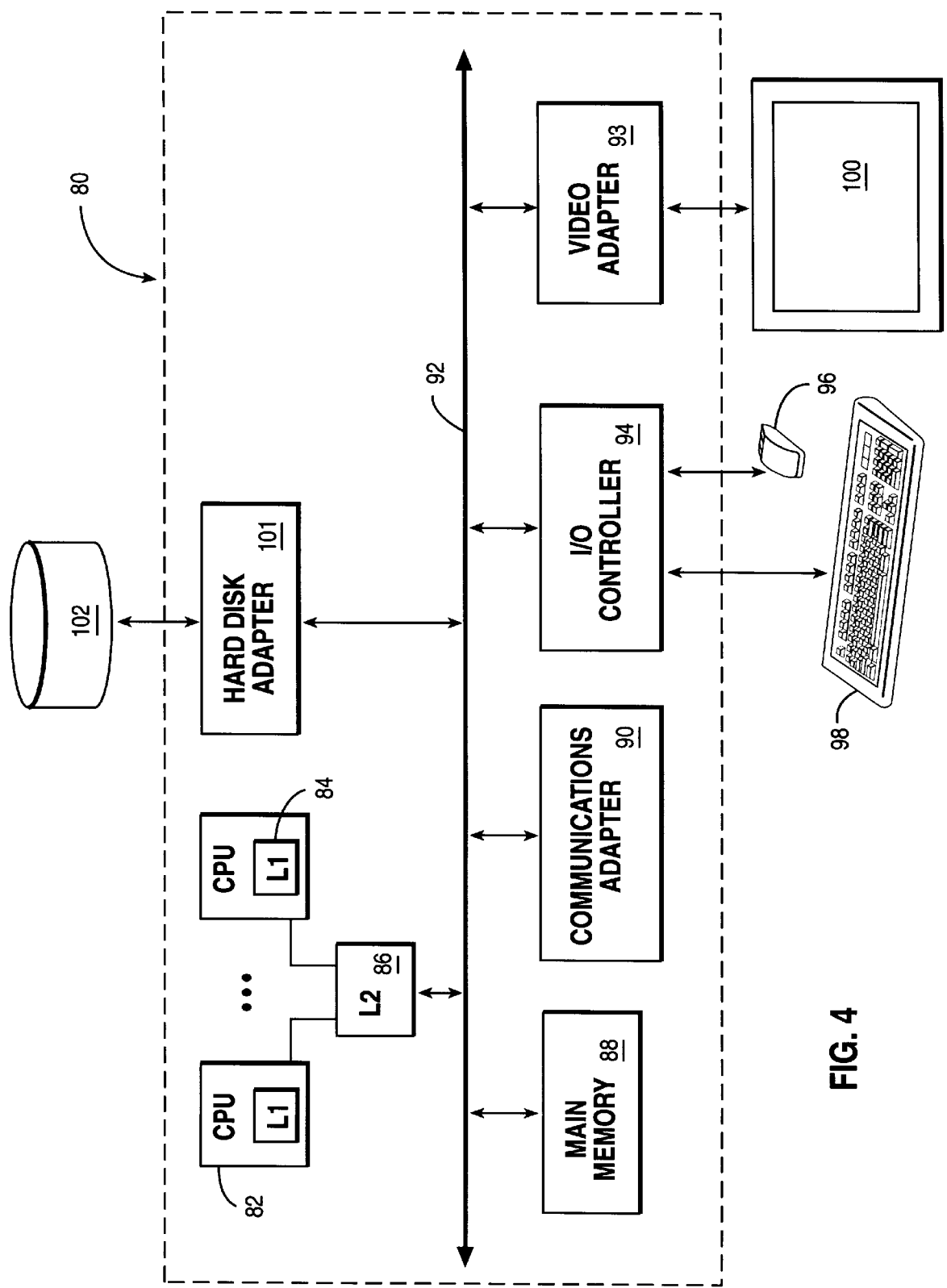
FIG. 4 is a device for delivering computing and online access capability where the invention may be practiced.

Referring to FIG. 4, there is shown a pictorial of a device 80 providing both computing and online access using a television set. The device 80 contains one or more central processing units (CPUs) 82, containing level-1 (L1) memories 84, and connected to a system bus 92 through level-2 (L2) memory 86. Main memory 88 provides additional storage for the execution of applications programs by CPUs 82. A communications adapter 90 allows the connection of modems or similar devices for communicating with online service providers. An I/O controller 94 allows communication with CPUs 82 by a keyboard 98 or pointing device 96 such as a mouse or remote control. Both the keyboard 98 and pointing device 96 may be wired or infrared, providing remote control operation up to 20 feet from the device 80. A television set 100 attached to video adapter 93 allows for the viewing of computing contents or online information. Permanent storage is provided on a hard disk 102 through a hard disk adapter 101.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for scrolling contents beyond the boundaries of a plurality of opened windows having a viewable area displayed to a user on said computer system, wherein each of said plurality of opened windows have associated boundaries, comprising the steps of:

providing a cursor having a directional indicator connected to a remotely operable pointing device in an active window of said plurality of opened windows;

detecting movement of said cursor at one of said associated boundaries of said active window responsive to the operation of said remotely operable pointing device by said user;

automatically scrolling the contents of said active window beyond said one of said associated boundaries in a direction indicated by said cursor within said viewable area by said user;

detecting the end of the contents beyond the associated boundaries of said active window during a horizontal scroll operation; and jumping to the closest one of said plurality of opened windows.

2. A method, implemented in a computer system, for scrolling contents beyond the boundaries of a plurality of opened windows having a viewable area displayed to a user on said computer system, wherein each of said plurality of opened windows have associated boundaries, comprising the steps of:

providing a cursor having a directional indicator connected to a remotely operable pointing device in an active window of said plurality of opened windows;

detecting movement of said cursor at one of said associated boundaries of said active window responsive to the operation of said remotely operable pointing device by said user;

automatically scrolling the contents of said active window beyond said one of said associated boundaries in a direction indicated by said cursor within said viewable area by said user;

detecting the end of the contents beyond the associated boundaries of said active window during a vertical scroll operation; and jumping vertically to the closest one of said plurality of opened windows.

3. An apparatus for scrolling contents beyond the boundaries of a plurality of opened windows having a viewable area displayed to a user on a computer system, wherein each of said plurality of opened windows have associated boundaries, comprising:

means for providing a cursor having a directional indicator connected to a remotely operable pointing device in an active window of said plurality of opened windows;

means for detecting movement of said cursor at one of said associated boundaries of said active window responsive to the operation of said remotely operable pointing device by said user;

means for automatically scrolling the contents of said active window beyond said one of said associated boundaries in a direction indicated by said cursor within said viewable area by said user;

means for detecting the end of the contents beyond the associated boundaries of said active window during a horizontal scroll operation; and means for jumping to the closest one of said plurality of opened windows.

4. An apparatus for scrolling contents beyond the boundaries of a plurality of opened windows having a viewable area displayed to a user on said computer system, wherein each of said plurality of opened windows have associated boundaries, comprising:

means for providing a cursor having a directional indicator connected to a remotely operable pointing device in an active window of said plurality of opened windows;

means for detecting movement of said cursor at one of said associated boundaries of said active window responsive to the operation of said remotely operable pointing device by said user;

means for automatically scrolling the contents of said active window beyond said one of said associated boundaries in a direction indicated by said cursor within said viewable area by said user;

means for detecting the end of the contents beyond the associated boundaries of said active window during a vertical scroll operation; and means for jumping vertically to the closest one of said plurality of opened windows.

\* \* \* \* \*